United States Patent [19]

Baran et al.

[11] Patent Number: 4,481,171
[45] Date of Patent: Nov. 6, 1984

[54] REACTOR FOR DRY FLUE GAS DESULFURIZATION

[75] Inventors: Stanley J. Baran, Cherry Hill, N.J.; John Van Camp, Philadelphia; Kurudamannil A. George, Levittown, both of Pa.

[73] Assignee: Proctor & Schwartz, Inc., Philadelphia, Pa.

[21] Appl. No.: 279,087

[22] Filed: Jun. 30, 1981

[51] Int. Cl.[3] .......................... B01D 47/00; F01C 1/00
[52] U.S. Cl. ................................. 422/176; 423/242; 55/230; 55/226; 159/4 A; 159/4 S
[58] Field of Search ................. 55/73, 230, 226; 159/4 S, 4 R, 4 A; 423/242 A, 244 A; 422/176; 34/10, 57 D, 57 E, 57 R; 261/79 A, 64 R, 84, 88

[56] References Cited

U.S. PATENT DOCUMENTS

| | | | |
|---|---|---|---|
| 2,238,364 | 4/1941 | Hall | 261/88 |
| 2,698,815 | 1/1955 | Bishop | 159/4 S |
| 3,803,723 | 4/1974 | Lamm et al. | 34/10 |
| 4,226,603 | 10/1980 | Larsson et al. | 159/4 S |
| 4,246,242 | 1/1981 | Butler et al. | 159/4 |
| 4,279,873 | 7/1981 | Felsvans et al. | 423/242 A |

FOREIGN PATENT DOCUMENTS

| | | | |
|---|---|---|---|
| 845156 | 7/1952 | Fed. Rep. of Germany | 55/393 |
| 755950 | 8/1956 | United Kingdom | 159/4 S |

OTHER PUBLICATIONS

Chemical and Engineering News, "Technology—System to clean up high-sulfur coal flue gas", Dec. 1, 1980, p. 28.

Primary Examiner—Bernard Nozick
Attorney, Agent, or Firm—Richard H. Thomas

[57] ABSTRACT

A spray reactor for flue gas desulfurization, particularly suitable for steam generators, uses an atomizing disc to spray an alkaline reagent into the flue gas. Concentric inner and outer annular passages around the disc convey the flue gas, the outer passage flow being controlled by a series of dampers adapted to maintain a relatively constant flow velocity in the inner passage in response to turndown of the generator load.

6 Claims, 8 Drawing Figures

FLUE GAS FLOW INPUT DATA

REACTOR FOR DRY FLUE GAS DESULFURIZATION

The present invention is directed to an improved spray reactor and particularly to an improved apparatus for cleansing waste combustion gases, particularly flue or stack gases from large generating stations. The present invention is especially concerned with the removal of sulfur oxides from such gases. For purposes of the present application, the term "spray reactor" means spray dryers as well as reactors.

BACKGROUND OF THE PRESENT INVENTION

Until recent years, large steam generating stations have been allowed to discharge waste combustion gases to the atmosphere with little or no purification. It has become well established that the escape of such gases, and particularly the acidic oxides therein, can be injurious and harmful to the surrounding environment and its inhabitants.

Particularly objectionable are the sulfur oxides generated in relatively large amounts in the burning of high sulfur-containing coals. These gaseous pollutants may react in the atmosphere to form acids which can have a very deleterious and toxic effect on the environment. This concern about the presence of sulfur oxides in stack gases has increased in recent years due to the shortage of low sulfur fuels such as natural gas, low-sulfur coal and fuel oil.

It is known to spray an atomized lime slurry into a waste stack gas stream for the purpose of reacting the lime with the sulfur oxides in the gas stream. This may be carried out in a conventional spray dryer, producing a dry powder which can be collected in a particulate collection apparatus such as a baghouse fabric filter. For instance, it was reported in the Chemical and Engineering News of Dec. 1, 1980, page 28, that such as system had been put into operation at a boiler at the Argonne National Laboratory in Illinois, converted to burn high-sulfur coal.

A principal problem experienced with such apparatus is that the volume of stack gases produced can vary substantially over a predetermined period, dependent upon the load placed on the generator. At night for instance, the load can be substantially less than during the day, as much as a third or a quarter of the maximum generator load, correspondingly affecting the volume of stack gas produced.

At the same time, the efficiency of reaction between the alkaline or lime slurry and the sulfur oxides is dependent at least in part upon the velocity of the gas flow into which the lime slurry is introduced. One criteria therefore is to maintain as constant a gas flow velocity as possible. By closely controlling velocity and maximizing the efficiency of the reaction, one can thus optimize the ratio of lime slurry to gas flow required for the reaction. This in turn makes it possible to prevent overcooling of the stack gases and the flow into the baghouse filter, insuring that such flow will be relatively dry to avoid condensation within the filter.

BRIEF DESCRIPTION OF THE INVENTION

In accordance with the concepts of the present invention, there is provided a spray reactor assembly particularly suitable for stack or flue gas desulfurization comprising a reactor vessel; an atomizing rotating spray disc axially positioned within said reactor vessel; means communicating said disc with a source of alkaline reagent, said disc being adapted to inject an atomized umbrella-shaped spray of said reagent into said reactor vessel; gas inlet means in the form of first and second annular duct means coaxial with said disc and defining inner and outer coaxial passages terminating in a plane above said disc adapted to impinge annular gas streams onto said umbrella spray; and damper means adapted to reduce the flow in the outer of said passages in response to turndown of the stack or flue gas flow.

Preferably, the inner passage contains vane means adapted to impart a swirl motion to the stack gas flow therein, the damper means being a plurality of spaced dampers adapted to move between open an closed positions.

The present invention also resides in a novel control for the spray reactor dampers comprising an annular ring encompassing said outer passage; and linkage means extending between said ring and each of the dampers in the outer passage, whereby on rotation of the ring, the dampers move to a more open or closed position. Preferably, the dampers are pivotable and successive dampers are adapted to pivot in opposite directions from an upright position to a zigzag or scalloped configuration.

It is also preferred that the dampers when closed converge to a point where they are contiguous but not in contact; that is, spaced apart at all times by at least a small amount, to provide passageways for at least some stack gas flow. This is for the purpose of preventing ash buildup even when the dampers are closed.

DETAILED DESCRIPTION OF THE INVENTION AND DESCRIPTION OF THE DRAWINGS

The invention and advantages thereof will become apparent upon consideration of the following specification with reference to the accompanying drawings, in which FIG. 1 is an overall perspective view of an apparatus for treatment of waste combustion gases in accordance with the concepts of the present invention;

Figure 1:
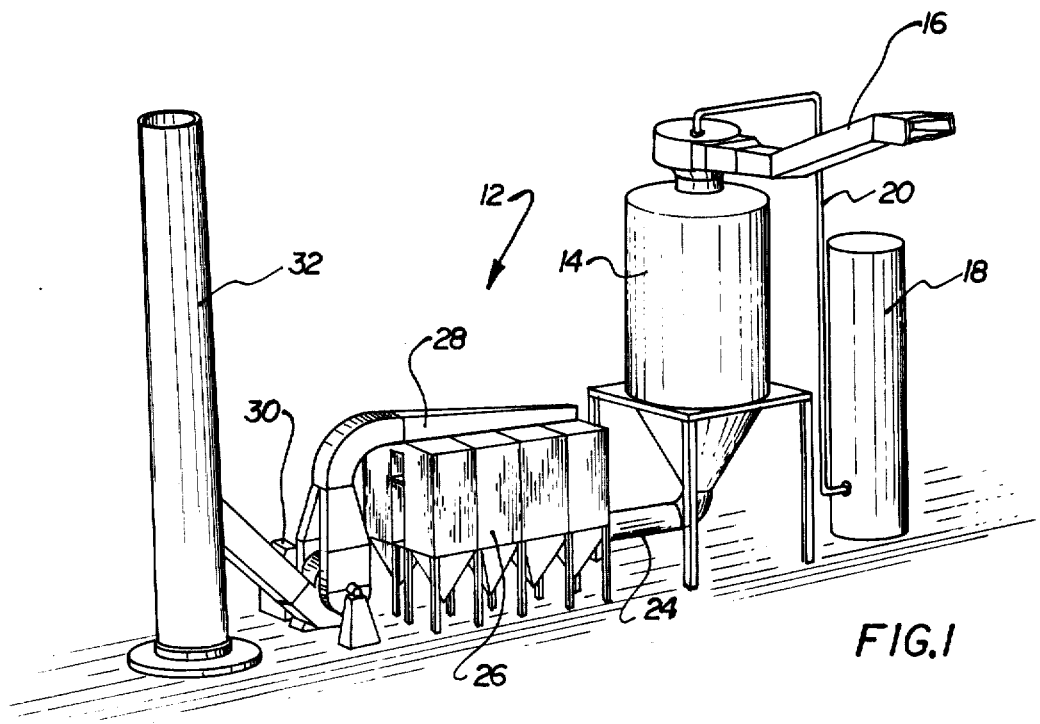

Referring to the drawings, and particularly to FIG. 1, there is illustrated a flue gas desulfurization apparatus according to the concepts of the present invention generally designated by the numeral 12. Waste gases from a large steam generating station, not shown, are introduced into the spray reactor 14 by means of duct work 16, the duct work being adapted to feed the waste gases into the upper end of the reactor 14. Also shown in FIG. 1 is a slake lime storage tank 18, with a line 20 adapted to pump lime slurry to the reactor 14 for introduction into the reactor at approximately the same point of introduction of the waste flue gases from duct work 16.

At the bottom of the reactor 14 there is provided an outlet 24, which leads to a conventional baghouse fabric filter 26, in which particulate matter is removed from the waste gas stream. The waste gas stream then passes through the baghouse filter by means of exhaust gas conduit 28 and booster fan 30, into stack 32 for dispersal into the atmosphere.

Generally, the reactor 14 is similar to the spray dryers and reactors used commonly in the chemical, food processing, and mineral preparation industries for many years. In operation, the sorbent solution or slurry is atomized into the incoming flue gas stream to increase the liquid/gas interface and to promote the mass transfer of sulfur dioxide from the gas to the slurry droplets, where the gas is absorbed. Simultaneously, the thermal energy of the gas evaporates the water in the droplets to produce a dry, powdered mixture of sulfate/sulfite and some unreacted alkali. Since the flue gas is not saturated and contains no liquid carryover, mist eliminators are not required. The particular reactions which occur in the reactor are conventional. By way of example, lime reacts with the sulfur dioxide in the following way:

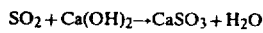

$$SO_2 + Ca(OH)_2 \rightarrow CaSO_3 + H_2O$$

$$2CaSO_3 + O \rightarrow 2CaSO_4$$

After leaving the spray dryer, the solids-bearing gas passes through the fabric filter 26, where the dry product is collected and where a percentage of the unreacted alkali reacts with sulfur dioxide for further removal. The cleansed gas is then discharged through the fabric filter plenum to the induced draft fan 30 and stack 32.

Although a preferred sorbent choice for the spray dryer system is a lime slurry, other sorbents can be employed such as sodium carbonate. Sodium carbonate generally achieves a higher level of $SO_2$ removal, but lime has a substantial cost advantage over sodium carbonate. Also, the use of sodium alkalis tends to create disposal problems because the alkalis are water soluble, relatively speaking.

As compared to limestone, it has been determined that lime has an $SO_2$ removal efficiency of 85% at a stoichiometric ratio of about one. Hand-in-hand with removal efficiency, is the concept of alkali utilization. While 100% utilization is obtainable with lime by adjustment of the reactor, limestone typically gives about 60-70% utilization. Increased utilization allows for lower stoichiometric ratios and generates less waste product. It also permits optimizing the reactor to prevent condensation from occurring in the fabric filter.

Maintaining design temperature in the fabric filter also has the advantage that is allows a percentage of the unreacted alkali in the collected waste on the bag surface to react with remaining $SO_2$ in the flue gas, further optimizing the process.

With regard to avoiding wetting the fabric, it is desirable to maintain a 25°-35° temperature margin above saturation temperature for bag protection.

Figure 2:
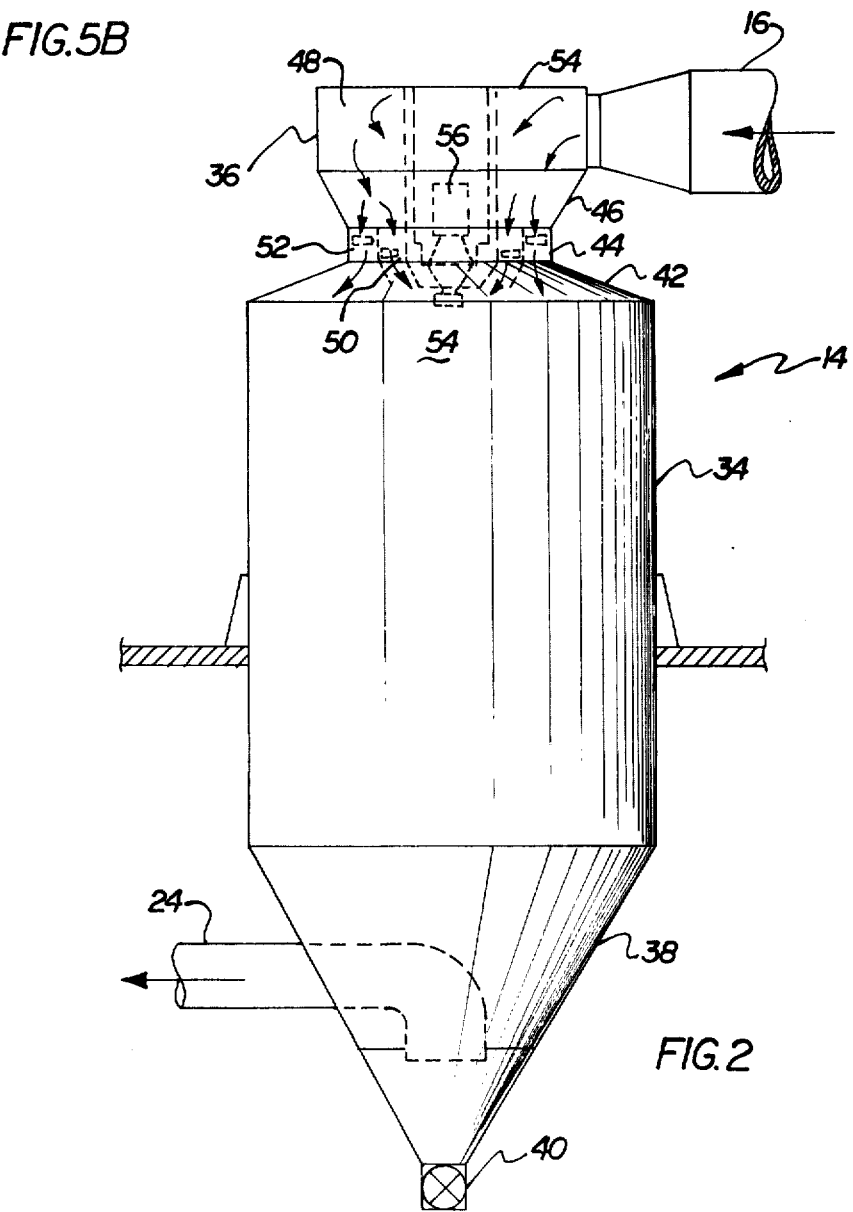
FIG. 2 is an elevation view of a spray reactor in accordance with the concepts of the present invention.

Details of the reactor 14 of the present invention are shown in FIG. 2. The reactor is basically a cylindrical vessel 34, having a head section 36 and a bottom section 38, the latter being provided with outlet 24 for exhaust gas and the bottommost outlet 40 for removal of trapped particulate.

The present invention is concerned primarily with details of the head section 36. The head section seats upon a frusto-conical surface 42, in turn resting on the cylindrical vessel 34. The head section comprises basically a lower cylindrical section 44, an intermediate inverted frusto-conical transfer zone 46, and an upper enlarged plenum chamber 48, into which flue gases from the generator are introduced via ductwork 16. As indicated by the arrows in FIG. 2, the flue gases enter the plenum chamber 48 and turn downwardly to flow through concentric inner and outer annular passages 50 and 52, into the reaction zone 54 of the reactor. Also illustrated in FIG. 2 is a housing 54, axially positioned within the head section 36, adapted to support an atomizing spray disc assembly 56, shown in phantom lines.

Figure 3:
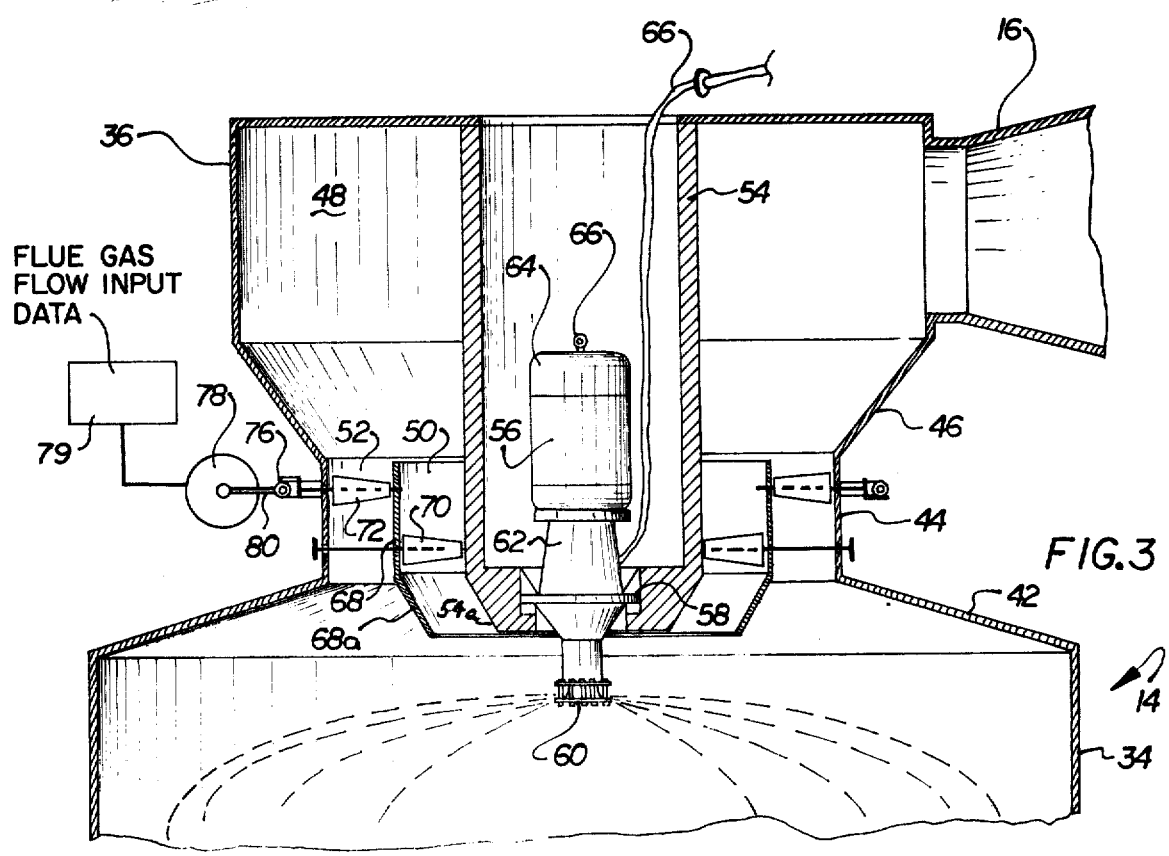
FIG. 3 is an enlarged elevation section view of a portion of the spray reactor of FIG. 2.
Figure 4:
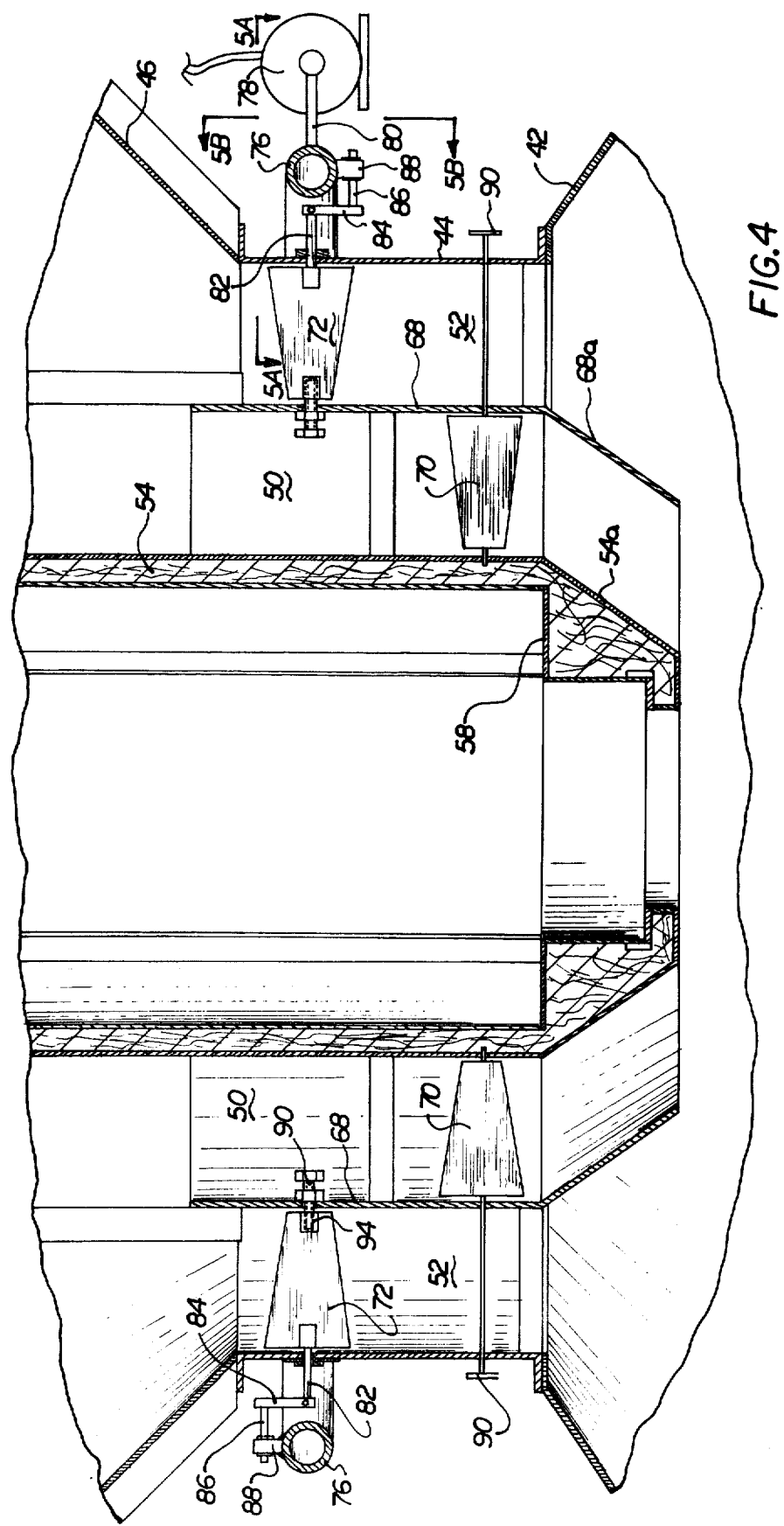
FIG. 4 is a further enlarged elevation section view illustrating details of control means for the spray reactor of the present invention.

Further details of the head section are shown in FIGS. 3 and 4. The housing 54 is a generally cylindrical member which is supported coaxially within the head section 36 so that the annular passages 50 and 52 are coaxial with the axis of the housing and embrace or encompass the lower portion of the housing. The lower portion of the housing, on the inside, is provided with a stepped surface 58, which supports the atomizing spray disc assembly 56. The latter consists primarily of an atomizing spray disc 60, intermediate gear reducer 62, and a high speed motor 64, seated on top of the gear reducer. The motor is adapted to drive the atomizing spray disc 60 at a very high speed. A lift ring 66 is provided to lift the entire assembly out of the housing 54 for repair and/or replacement by a new assembly. Shown in FIG. 3 is line 66 adapted to feel an alkaline slurry to the assembly and spray disc 60 for atomization by the spray disc into the reactor 34. In this latter respect, the spray disc atomizes the alkaline slurry and introduces it into the reactor forming an umbrella pattern in the upper reaction zone of the reactor, as shown.

The two passages 50 and 52, are defined by the outer surface of the housing 54, an annular divider 68, encompassing the housing and spaced from it, and the lower cylindrical section 44 of the head section. As shown, the respective surfaces are all cylindrical and concentric, except for the very lowermost portions 68a and 54a of the divider 68 and housing 54, which are turned inwardly, the purpose being to deflect the flue gas stream in the inner passageway 50 axially in the direction of the atomizing disc 60.

Figure 6:
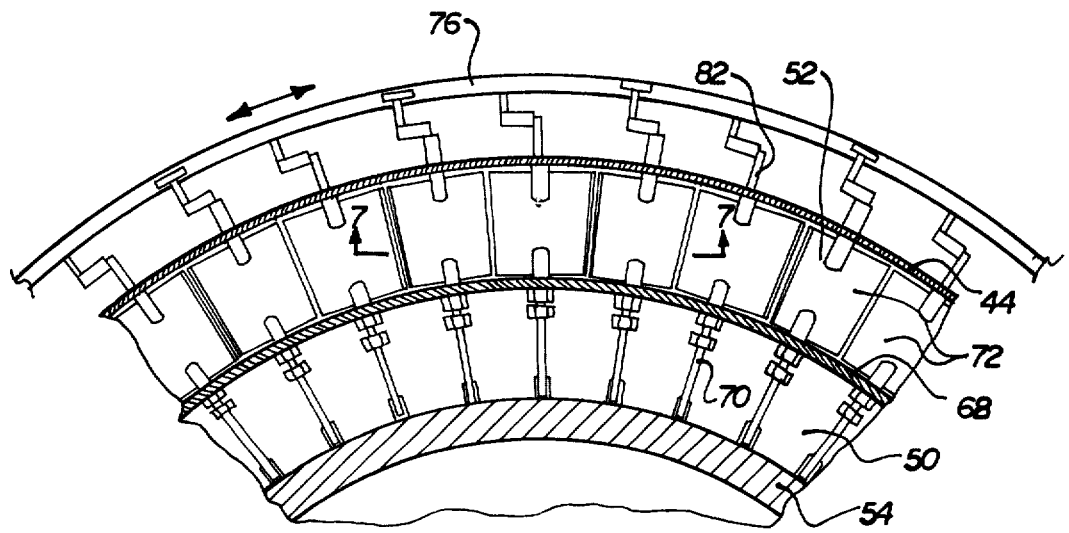
FIG. 6 is a plan view of a portion of the apparatus of FIG. 4 showing the dampers in a closed position.

Both the passages 50 and 52 are provided with a plurality of vanes or dampers 70 and 72 located in the passages to control the flow of air in the passages. FIG. 3 shows the vanes or dampers in an upright position, aligned generally with the direction of flow of gas in the passages, so that there is little control of the flow in this position. The vanes or dampers are frusto-conical in shape, provided with converging opposite edges, so that when turned on their axes, the contiguous edges of successive such vanes or dampers come together and are more or less parallel. This is illustrated in FIG. 6, which shows the dampers 72 in the outer passage 52 turned so as to close the passage. As shown in FIG. 6, the edges of the dampers converge from a wider outer damper surface to a narrower inner damper surface so as to interfit in the curved annular space of the passage.

Figure 7:
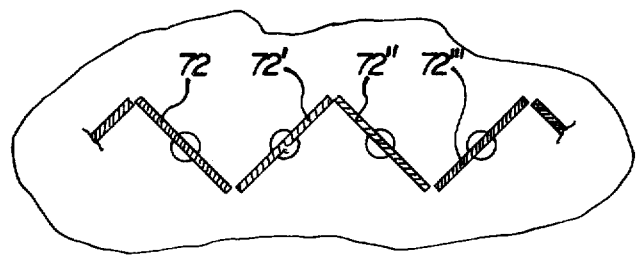
FIG. 7 is a section view taken along line 7—7 of FIG. 6.

FIG. 7, which is a section view taken along line 7—7 of FIG. 6, shows the positioning of the dampers to close off passage 52. Successive dampers are pivoted in opposite directions so that dampers 72' and 72" come together at their upper edges and dampers 72" and 72' at their lower edges. Means are provided to limit the amount of rotation of the dampers, as it is desirable that they never come exactly together. In other words, it is desirable to avoid ash accumulation and, for this purpose, some separation between successive dampers preferably is maintained. Alternatively, the dampers can be pivoted in the same direction to close the passage 52.

The vanes 70 in the inner passage 50 (FIGS. 3 and 6) operate similar to the dampers in the outer passage. In other words, they are rotated on their axes to control the air flow in the passage. However, as distinct from the dampers in the outer passage, the vanes in the inner passage are not adapted to act as dampers and close the passage, but rather are adapted to be turned in the same direction to impart a swirling or directional flow to the gas exiting from the passage. All of the vanes in the inner passage can be adjusted to the same angle with respect to the gas flow in the passage, or to different angles. For instance, it may be desirable to provide a uniform swirling motion around the entire periphery for the gas exiting from the inner passage. Alternatively, it may be desirable to have the flow on one side of the reactor swirling in one direction, and the flow on the opposite side of the reactor swirling in the opposite direction. Other variations with regard to the setting of the vanes 70 in the inner passage 50 are within the scope of the present invention.

In other words, it is contemplated that only the outer passage 52 would be more or less closed to the flow of gas, in proportion to turndown in the generator load. In this regard, FIGS. 3 and 6 show the presence of only one outer passage 72. Several concentric passages can be provided if desired to give a greater degree of control with generator turndown.

Figure 5B:
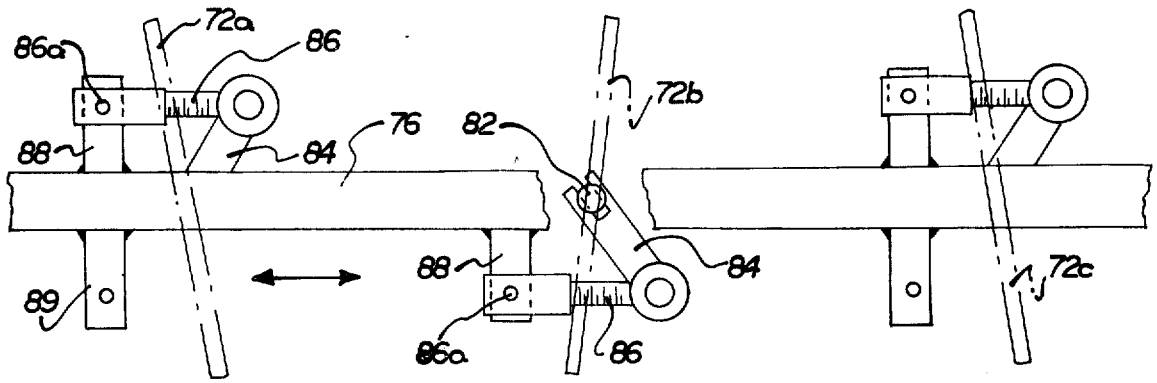
FIG. 5b is an enlarged elevation view taken along line 5B—5B of FIG. 4.
Figure 5A:
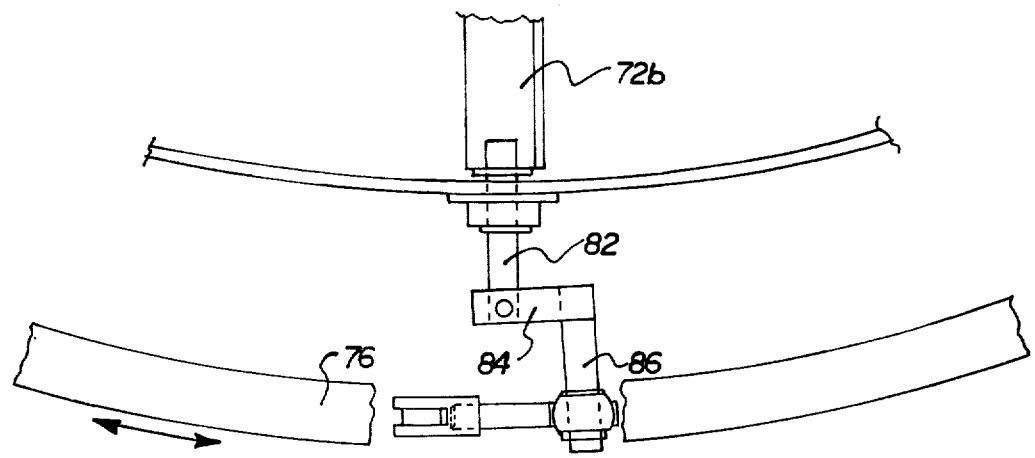
FIG. 5a is an enlarged plan view taken along line 5A—5A of FIG. 4.

By suitably dimensioning the inner and other passages (one or more), it is possible, by opening and closing the dampers in the outer passage, to maintain a relatively constant velocity flow in the inner passage in response to changes in the generator turndown with changes in load. This in turn results in optimum efficiency of reaction between the alkaline reagent and flue gas and allows the use of approximately a stoichiometric amount of reagent, or that amount necessary to avoid unduly cooling the gases and wetting the fabric filter downstream of the reactor. FIGS. 4, 5a and 5b illustrate details for control of the dampers 72 in the outer passage 52. The control in essence comprises an annular ring 76, which is actuated in a clockwise or counter-clockwise direction by means of a piston actuator 78, responsive to control 79 (FIG. 3) which, in turn, is responsive to flue gas flow input data, and connector 80 (FIGS. 3, 4) extending between the piston actuator and the ring. The damper shaft 82 (FIGS. 4, 5a, 5b, is provided with a lever 84 keyed at right angles to the shaft and a linkage 86, 88 between the lever and ring. The member 88 is a post welded to the ring, whereas the member 86 is pivotably secured to the post end by pin 86a (FIG. 5b). If the ring 76 is moved in a counter-clockwise direction, moving to the left in FIG. 5b, looking at the left-hand most damper, this moves upwardly extending post 88 to the left, pulling shaft 86 to the left. As the shaft 86 is pivotally connected to the end of lever 84, the latter is caused to rotate in a clockwise direction, in turn causing the damper 72a to be pivoted in a counter-clockwise direction (looking inwardly towards the axis of the reactor). On the other hand, if the ring 76 is moved clockwise, the damper 72a is pivoted in the opposite clockwise direction.

The support shafts 82 for all of the dampers are on the same horizontal plane. However, alternate posts 88 for the shafts extend downwardly and upwardly as shown in FIG. 5b, so that the next damper 72b (in either direction to the damper 72a) is pivoted in an opposite clockwise direction with counter-clockwise movement of the ring 76. This results on closure of the dampers to the configuration shown in FIG. 7.

The control of FIGS. 4, 5a and 5b permits moving all of the dampers in the same direction if desired. FIG. 5b shows a post 89 extending downwardly. At all post positions, there are both upwardly and downwardly extending posts. By connecting the linkages 86 to either the upward posts or the downward posts, the same movement of the dampers can be achieved.

Whereas the dampers in the outer passage 52 are controlled in unison, it may be desirable to provide individual manual controls 90 for the vanes 70 in the inner passage 50 (FIG. 4). The reason for this is that once the swirl pattern for the gas in the inner passage 50 is established, little additional adjustment need be made. However, the dampers 72 in the outer passage 52 require constant adjustment, depending upon turndown or load of the generator.

Several advantages accrue from the control arrangement of the present invention. For one, the linkage between the ring 76 and dampers permits control of the dampers by only sideways movement of the ring. That is, the ring need have only a single degree of freedom of movement in a rotational direction (either clockwise or counter-clockwise). This permits use of a very simple support for the ring, for instance, the use of three equally spaced support rollers. This is important in the present invention. Support of the ring is critical because of its large size, and a support which would allow more than one degree of freedom of movement would be very complicated and expensive.

Another feature is ease of replacement of the damper blades. As shown in FIG. 4, the blades 72 at their inner ends are supported on pins 90, threaded into nuts 92 welded to divider 68. The pins seat in sockets 94 in the blade ends. It is a simple matter to withdraw the pins 90, disconnect linkage 84 and the damper shaft 82, and slide the dampers from the passage 52.

The particular atomizing disc employed in the reactor of the present invention is not critical. By way of example, an atomizing wheel such as that shown in the Cordua U.S. Pat. No. 3,080,122, assigned to assignee of the present invention, may be employed.

By the present invention, a wide range of turndown ratios are available. For instance, by progressively closing down the outer passage 52, the turndown ratio can be varied between full load flow and about one quarter load flow. Generally, the objective of the present invention is to maintain a relatively constant velocity flow of gas exiting from the inner passage 50, towards maintaining an optimum efficiency reaction between the alkaline reagent and flue gas. Preferably, the velocity in the inner passage 50 is maintained at about 1800 to 3500 feet per minute. In the outer passage, the velocity can be reduced from about 3500 feet per minute, for a maximum generator load, to about 100 feet per minute for maximum turndown, while maintaining the desired velocity in the inner passage. This gives optimum reaction efficiency.

The present invention is particularly adaptable for use with large steam generators which are subject to varying loads. However, the present invention broadly is useful with any burner apparatus wherein contaminants evolve in hot stack gases and are capable of removal by reaction with a fluid reagent producing a dry particulate.

What is claimed is:

1. A spray reactor assembly particularly suitable for flue gas desulfurization adjustable to compensate for substantial turndown of flue gas flow, comprising
   a reactor vessel;
   an atomizing rotating spray disc axially positioned within said reactor vessel;
   means communicating said disc with a source of alkaline reagent, said disc being adapted to inject an atomized, umbrella-shaped spray of said reagent in said reactor vessel;
   gas inlet means in the form of first and second annular duct means coaxial with said disc and defining inner and outer annular coaxial passages terminating in a plane above said disc adapted to impinge annular gas streams onto said umbrella spray; and
   damper means adapted to reduce the flow in the outer of said passages, in response to turndown of the flue gas flow, sufficient to maintain a relatively constant velocity flow in the inner of said passages.

2. The assembly of claim 1 including vane means in the inner of said passages adapted to impart a swirling mortion to the flue gas flow therein.

3. The assembly of claim 1 wherein said alkaline reagent is a lime slurry.

4. The assembly of claim 1 wherein said damper means comprises a plurality of adjacent dampers transverse to the direction of flow in said outer passage, pivotable between open and closed positions.

5. The assembly of claim 4 including control means for said dampers, said control means comprising an annular ring encompassing said outer passage, and linkage means between said ring and each of said dampers.

6. The assembly of claim 5 wherein said ring is movable in a clockwise or counter-clockwise direction only, said linkage means being adapted to pivot successive dampers in opposite directions to define a zigzag or scalloped damper configuration.

* * * * *